June 25, 1929. F. A. WETTSTEIN 1,718,673
FLUID PRESSURE REGULATOR AND RETURN MOTION THEREFOR
Filed March 31, 1927 4 Sheets-Sheet 4

INVENTOR
Fritz A. Wettstein

Patented June 25, 1929.

1,718,673

UNITED STATES PATENT OFFICE.

FRITZ A. WETTSTEIN, OF NEW YORK, N. Y.

FLUID-PRESSURE REGULATOR AND RETURN MOTION THEREFOR.

Application filed March 31, 1927. Serial No. 179,946.

This invention relates to automatic regulation, more particularly to automatic regulation of the fluid pressure type and still more particularly to automatic fluid pressure regulation provided with return motion mechanism or means or arrangements for the prevention of over traveling and hunting.

Return motion arrangements are principally of two types; rigid return motion where a definite relation always exists between the position of the control member and the condition which is to be regulated, in which type of regulators momentary or passing variations in the condition to be regulated are determined by the same factors as the remaining or permanent variation; and second, elastic or resilient return motion, where no definite relation exists between the position of the control member and the regulated condition, wherein the passing variations is determined by different factors than the remaining variation, wherein the regulator may be highly stable and yet the remaining variation may be very small or equal to zero. This invention more particularly refers to this last type of return motion.

Amongst the various objects of my invention are: To provide a practical, operative, simple and highly efficient fluid pressure regulator in which highest accuracy and speed of regulation are combined with great stability; to provide a simple and effective return motion arrangement which may operate without the use of cataracts, dash pots or the like; to provide a fluid pressure regulator capable of high speed of regulation without tendency toward oscillation or hunting; to provide a fluid or liquid return motion arrangement of the resilient type in which levers, cataracts, dash pots or the like may be dispensed with; to provide means for adjusting the speed of regulation within wide limits; to provide a fluid pressure regulator with resilient return fluid pressure regulator with resilient return motion where the entire regulating mechanism is connected to the means actuating the control member only by means of one or several fluid pressure conduits, without the use or addition of mechanical interconnection, so that the entire regulating mechanism may be located at a distance from servo motor and control means, and so that in cases where a number of regulators are used the regulating mechanism consisting of regulator proper, pilot valve or its equivalent, return motion arrangement and adjustments, may be arranged together at a convenient central place, whereas the control means such as valves, dampers and the like, together with the means actuating them, may be located each at a different place, distant from the central regulating mechanism and only connected to the same by means of liquid pressure conduits; to derive the return motion directly and in an accurate and positive way from the controlled pressure fluid and not from the movement of the control member or servo motor, so that an immediate and quick return motion is obtained and delay and inaccuracy due to the time required to accelerate servo motor and control member and due to play and friction in servo motor and mechanical return motion arrangements are prevented; to provide a direct acting resilient fluid pressure return motion combined with balanced means for controlling the pressure fluid actuating the control member, so that the pressure fluid exerts no undue dynamic force on said return motion arrangement and said balanced control means, so that chattering, vibrating and hunting of any portion of the regulator may be prevented without the use of dash pots or the like; to provide a fluid pressure regulator in which all moving parts are enclosed and moving in and lubricated by the pressure fluid used for the actuation of the regulators; to provide a fluid pressure regulator with resilient fluid pressure return motion where forces due to unbalanced control members such as valves, dampers and the like, or friction in the same, do not affect the condition to be regulated nor the amount and character of the permanent variation; to provide a fluid pressure regulator with wide unrestricted conduits or channels for the pressure fluid, resulting in immediate and quick regulation, and a direct acting fluid pressure return motion arrangement and balanced fluid pressure control means for immediate and quick return motion, and a governor having a high degree of stability, such as for instance highly stable speed governors or stiff pressure diaphragms or pressure pistons loaded by stiff springs and the like, so that more rapid regulation and greater stability may be obtained than is possible when dash-pots or the like are used.

Further objects, novel features and advantages of the invention will be apparent as the description proceeds which is presented with reference to the accompanying drawings of which:

Figure 1:
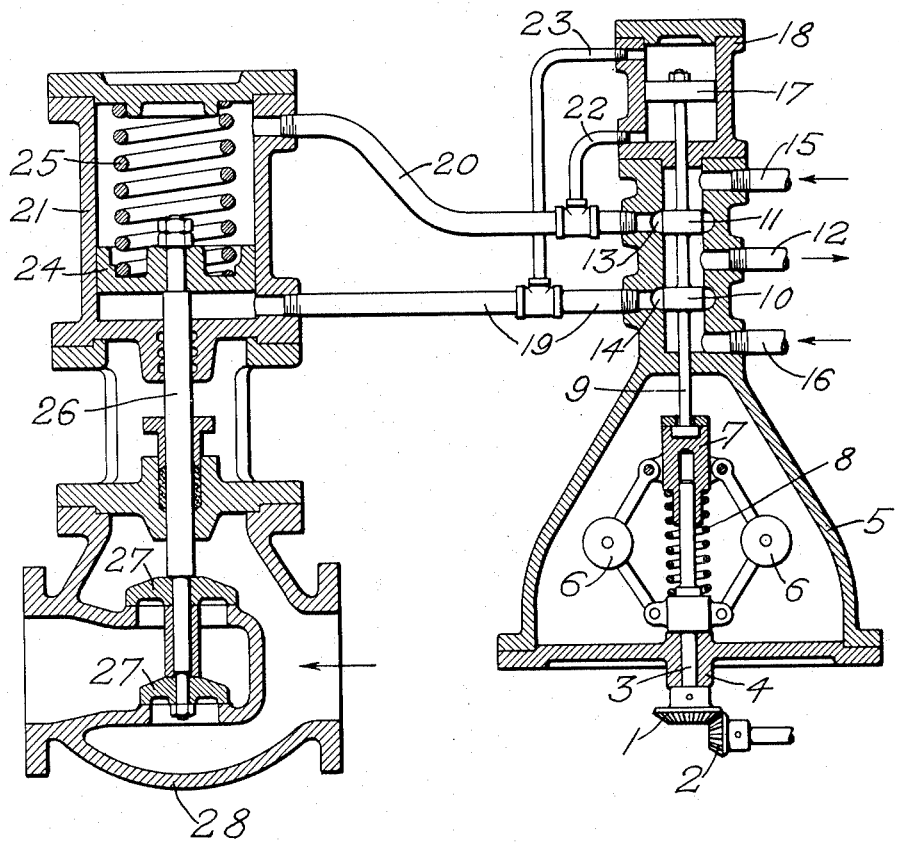
Fig. 1 is a sectional view of one embodiment of the invention as applied to a speed controlled regulating valve.

Principle and operation of the invention can probably most readily be determined upon consideration of Fig. 1 which is more or less diagrammatic but which shows clearly the principal parts of one form of a fluid pressure regulator embodying the direct resilient fluid pressure return motion which serves to bring out the desired results.

In Fig. 1 a speed governor has been chosen by way of example to illustrate the invention. It is to be understood however that the invention refers to any kind of regulation so that the speed governor shown in Fig. 1 may indicate means responsive to a regulating impulse indicating any physical, chemical or electrical condition such as temperature, pressure, water level, $CO_2$ content of combustion gases and the like.

In Fig. 1 the speed governor is driven by conical gears 1 and 2. Gear wheel 2 and shaft 3 rotate in a thrust bearing 4 in governor casing 5. The fly weights 6 of the speed governor tend, during operation, to force member 7 downward against the action of spring 8. Member 7 is connected to stem 9 on which pistons 10 and 11 are provided, forming together with fluid pressure outlet 12, ports 13 and 14 and fluid pressure inlets 15 and 16 in casing 5 a balanced pilot valve. On upper prolongation of pilot valve stem 9 is mounted return motion piston 17 which is movable in cylinder 18. Stem 9 may be connected rigidly to member 7 of the speed governor so that the pilot valve and return motion piston rotate together with the speed governor, thus reducing friction against vertical movements to a minimum. Pilot valve ports 13 and 14 are connected by means of conduits 19 and 30 to serve motor cylinder 21 and by means of conduits 22 and 23 and portions of conduits 19 and 20 to return motion cylinder 18. In servo motor cylinder 21 is situated a movable servo motor piston 24 which is loaded by spring 25 and by means of stem 26 actuates the control member consisting of balanced valve discs 27 in valve body 28.

The mode of operation is as follows:

For reasons which will become apparent as the description proceeds it is desirable in some cases to omit servo motor spring 25 and the operation without spring 25 is therefore described first. Assuming now that the system is in a condition of equilibrium and that then the number of revolutions per unit of time of the speed governor decreases. Spring 8 is arranged to overcome the action of flyweights 6 and tends to move stem 9 with pilot valve and return motion piston 17 upward. In case a compressible gas or vapor is used as the actuating pressure fluid, return motion piston 17 is free to move. In case an incompressible liquid is used as pressure fluid and if the pilot valve covers its ports exactly, return motion piston 17 would theoretically have to move servo motor piston 24 slightly until the pilot valve has sufficiently opened its ports to allow the return motion piston 17 to move freely. The pilot valve may therefore preferably be built so that a small amount of leakage always exists around its ports. If now the pilot valve moves upward, pressure fluid is admitted from supply conduit 16 to port 14 and from there through conduit 19 to the chamber below servo motor piston 24 and also through conduit 23 to the chamber above return motion piston 17. On the other hand pressure fluid from the system formed by the upper servo motor chamber, the lower return motion chamber and conduits 20 and 22 will be allowed to pass out through pilot valve ports 13 and 12. The pressure differential which thus is created in these two pressure systems tends to move the servo motor piston upward and the return motion piston downward. Since the return motion piston and pilot valve move practically without friction, the pressure differential causes the return motion piston to move downward until the pilot valve has returned in its center or normal position where all ports are closed or where no movement of the servo motor and return motion piston results. The pressure differential on the return motion piston is now maintaining balance against the upward thrust of the speed governor due to the increased speed. There exists a definite relation between the pressure differential and the number of revolutions of the governor. This relation is determined by the characteristics of the governor and the size of the return motion piston. For instance, a large pressure differential results from a small change in the number of revolutions if the return motion piston is made comparatively small. In the above described example, the speed of the governor now decreases further until the pressure differential between the two pressure systems becomes sufficiently large to overcome the fricton of the servo motor and control member, whereupon the same will move upward and admit more power fluid to the prime mover, which may for example be a turbine supplied with steam through valve 28. By making servo motor piston 24 comparatively large in proportion to return motion piston 17, a slight change in the number of revolutions may cause a movement of servo motor and control member. As soon as the servo motor piston moves, the pressure differential decreases, return motion piston and speed governor are again unbalanced so that the pilot valve opens and creates again a pressure differential which acts upon servo motor piston and return motion piston. The process of regulation comes to an end as soon as the control member has moved sufficiently to meet the increased demand for power fluid in the prime mover.

Since the control member or valve 28 is practically balanced, equilibrium can only exist when the fluid pressures on the two sides of the servo motor piston are equalized, and since the same pressures act on the two sides of the return motion piston, the number of revolutions must be the same at the end of the process of regulation as at the beginning. The system as described above constitutes therefore an isodrom governor, i. e. the governor has no permanent or remaining variation, the speed of the prime mover is always the same during balanced conditions, independent of the load. During unbalanced conditions, the number of revolutions will only change sufficiently to overcome the friction of the governor system and as soon as the control member or valve is in the position required by the new load, the number of revolutions will return to its normal value. The governor system has therefore only a passing variation which is determined by the characteristics of the construction and the friction which has to be overcome.

It is further evident that the system consisting of governor, pilot valve and return motion arrangement, as shown to the right in Fig. 1, is connected to the servo motor and control member only by means of two fluid conduits or pipes, without any mechanical interconnection so that the two systems easily may be located at distant places if this is desired.

Since it is one of the most important advantages of this invention to provide increased stability of regulation, the various factors contributing to this result are explained with reference to the modification shown in Fig. 1, but these explanations also apply to the systems shown in Figs. 2, 3 and 4, which are only different modifications of the same invention. Since the system consisting of governor proper, pilot valve and return motion arrangement is independent of the movement of the servo motor, the time required to accelerate the servo motor and control member has no ill effect on the stability of the regulator. The governor with pilot valve and return motion arrangement forms in itself an independent system, the stability of which may be increased by providing a highly stable speed governor, by providing a powerful return motion piston and by providing a completely balanced pilot valve, so that the flow of pressure fluid through the same will not cause chattering or exert any undesirable forces on the pilot valve and the parts connected to the same. By providing wide passages for the pressure fluid, a direct and positive return motion action is obtained that in certain cases is preferable to a construction employing dash-pots or the like. The direct fluid pressure return motion also greatly reduces the possibility for lost motion and undue friction.

In many cases it is desirable to have a remaining or permanent variation, so that a definite load corresponds to each number of revolutions of the prime mover. Any desired degree of permanent variation may be obtained by providing a spring 25 of suitable stiffness on servo motor piston 24. The mode of operation of the system is then exactly the same as described above, with the only difference that to each position of the servo motor piston there corresponds a definite differential between the fluid pressures acting on the two sides of the servo motor piston and on the corresponding sides of the return motion piston, and therefore also a definite number of revolutions of the governor.

In some cases it is desirable to adjust the speed of operation of the control member for different values. This speed of regulation depends on the width of the various channels or conduits and ports for the pressure fluid and may therefore for instance be adjusted by changing the stiffness of spring 8 on the return motion piston.

Figure 2:
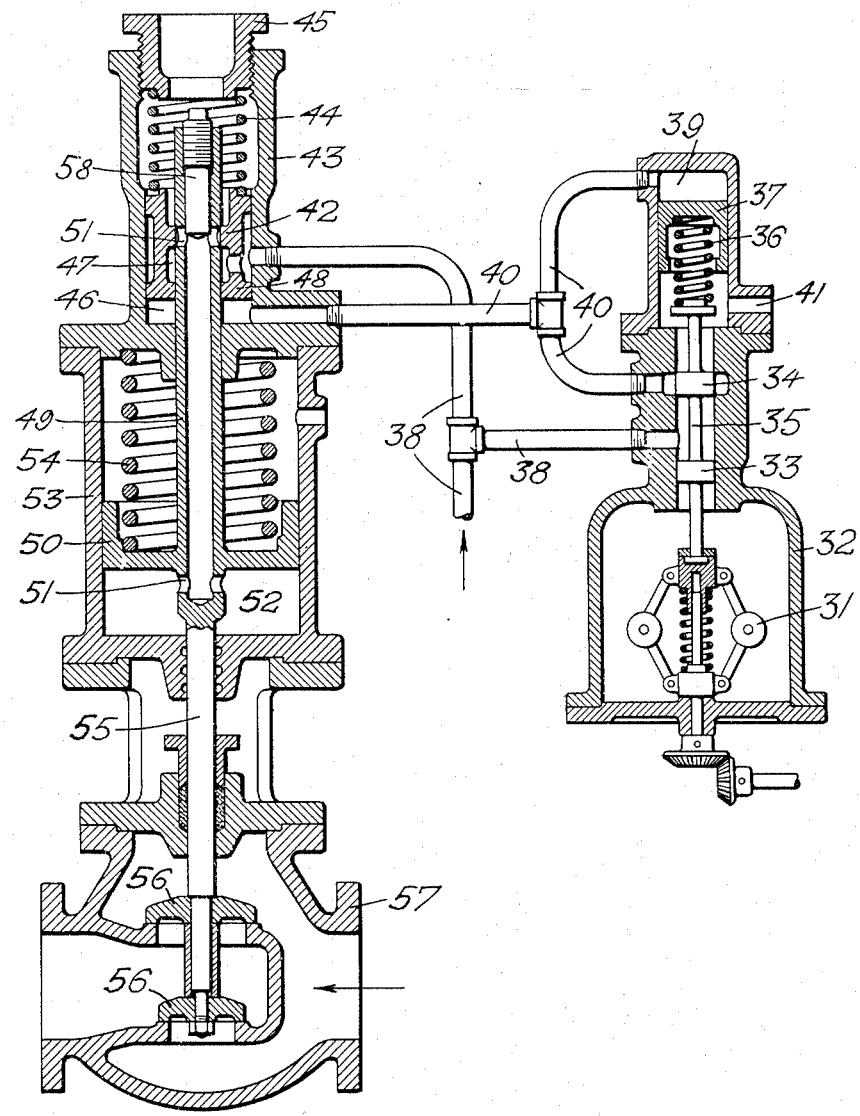
Fig. 2 is a sectional view of a similar form of the invention as applied to a speed controlled regulating valve with two relays arranged in series.

The modification as shown in Fig. 2 permits the securing of increased accuracy, sensitiveness and power of control. In this Fig. 2, 31 designates a speed governor in casing 32 and actuating directly the pilot valve consisting of pistons 33 and 34 mounted on stem 35. The upper prolongation of pilot valve stem 35 holds spring 36 which at its upper end is actuated by the return motion piston 37. From the conduit system 38 which is in communication with the source of the pressure fluid, pressure fluid may be admitted past the lower edge of pilot valve piston 34 to the pressure system formed by the conduits 40. On the other hand, if the pilot valve piston 34 is in a position below its center or closed position, pressure fluid may pass from the conduit system 40 past the upper edge of the pilot piston 34 and through port 41 to the atmosphere. Conduit system 40 is in communication with chamber 39 above return motion piston 37. From the conduit system 38, pressure fluid is also supplied to chamber 47 of the balanced pilot valve 42 which is movably arranged in casing 43 and loaded by spring 44 which may be adjusted by screw 45. At its lower portion pilot valve 42 forms the relay piston 48 which is actuated by the pressure in chamber 46 which communicates with conduit system 40. Inside the pilot valve 42 is arranged the movable slide 49 which is connected to servo motor piston 50 and provided with ports 51 communicating with chamber 52 below servo motor piston 50 which is movably arranged in servo motor cylinder 53. Servo motor piston 50 is loaded by spring 54 and is connected by means of stem 55 to valve discs 56 forming together with valve body 57 the control member in the form of a balanced valve. 58 designates an adjustment screw adapted to throttle the flow of pressure fluid through ports 51.

The mode of operation is as follows:

Supposing that the governor system is in equilibrum and that then the number of revolutions of the prime mover decreases due to an increase in the load. This causes governor 31 to move pilot valve piston 34 upward so as to admit pressure fluid from conduit system 38 to the conduit system 40 and to the chambers 39 and 46. The resulting increase in pressure in the conduit system 40 causes return motion piston 37 to move downward, compressing spring 36 and moving the pilot piston 34 until the same is returned to its original position where all ports are closed, so that over regulation is prevented. At the same time, the increase in pressure in the conduit system 40 causes an upward movement of the relay piston 48 against the action of the spring 44. This causes pilot valve 42 to admit pressure fluid from chamber 47 through ports 51 to chamber 52, so that the servo motor piston 50 is moved upward resulting in an increased opening of the valve discs 56.

An increase in the number of revolutions would evidently cause opposite movements of the various parts and result in a closing action of the valve discs 56.

From the above description it is evident that during conditions of equilibrum, to each number of revolutions corresponds a definite pressure in conduit system 40, which in turn defines the position of relay piston 48 with corresponding position of slide 49, servo motor piston 50 and valve discs 56. The system has therefore a certain permanent variation which among other factors is determined by spring 44 and may be changed by changing the characteristic of this spring.

During regulation on the other hand, the action of this regulator system is chiefly determined by the characteristics of the speed governor and the stiffness of spring 36. By providing a stable speed governor, great stability of the regulating system may be obtained. Since further the pilot valve is the only part which is rigidly connected to the speed governor, the ill effect caused by the acceleration of the moving parts of the governor and other parts connected therewith, is reduced to a minimum. Since further pilot valve 34 is entirely balanced and free to move and since friction is reduced to a minimum due to its rotation, greatest sensitiveness and accuracy of control is obtained. An unbalance of control member 56 or friction in the parts connected to the same, will have no effect on the regulation as there is no mechanical interconnection between the servo motor and the speed governor and also no common fluid pressure actuation of these parts.

The regulating system as shown in Fig. 2 may be considered as consisting of two relays or amplifiers arranged in series. The first relay comprises the apparatus shown to the right in Fig. 2 including the relay piston 48 at the left. This relay contains the direct resilient fluid pressure return motion which is the primary feature of this invention, and which provides for the desired stability and sensitiveness. The second relay is composed of the relay piston 48 including the other parts shown at the left of Fig. 2. This relay is provided with a rigid return motion mechanism, which may be of any type known to those skilled in the art, and which serves to increase the power of regulation and gives in combination with the first relay the additional advantages as described above.

Figure 3:
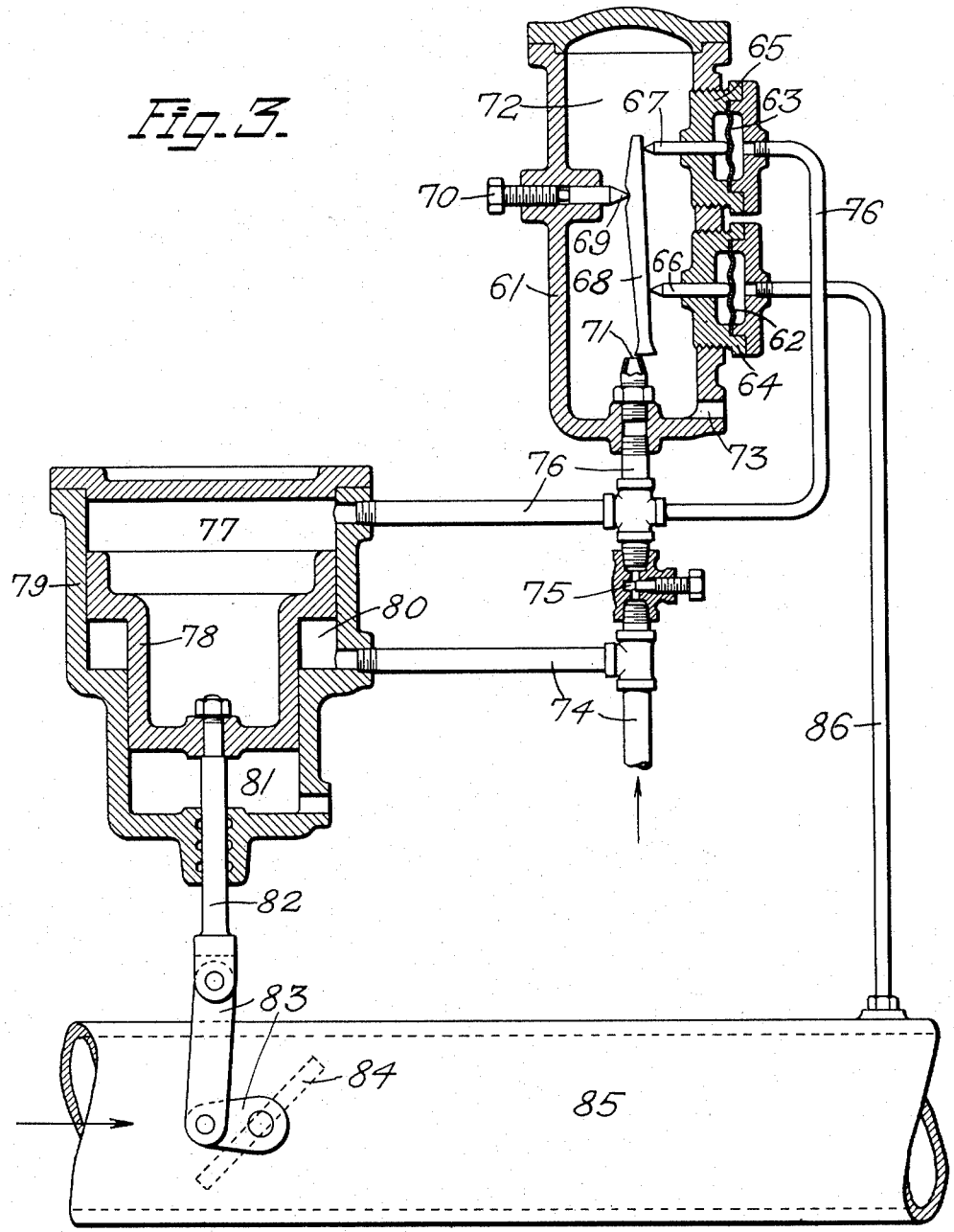
Fig. 3 is a sectional view of another form of the invention as applied to a gas pressure and damper control mechanism.

In Fig. 3, 61 designates a relay casing on which are mounted pressure diaphragms 62 and 63 by means of the threaded diaphragm holders 64 and 65 which allow to adjust the position of the diaphragm relative to the relay casing 61. The deflections of the diaphragms are transmitted by rods 66 and 67 to throttle lever 68 which is supported on edge 69 and is movable around this edge and in a plane parallel to the plane of the section shown in Fig. 3. The position of edge 69 may be adjusted by means of a screw 70. The lower end of throttle lever 68 forms part of a cylindrical surface with edge 69 as the axis of the cylinder and is adapted to throttle the outflow of pressure fluid from the nozzle 71. Due to the cylindrically shaped end of the throttle lever 68, the power which is exerted by the pressure fluid in nozzle 71 on the throttle lever is always directed toward edge 69 so that the throttle lever 68 is completely balanced with regard to the pressure fluid. The pressure fluid exhausting from nozzle 71 into chamber 72 is allowed to pass through port 73 to the atmosphere. Pressure fluid is supplied to piping or conduit system 74 and from there past the adjustable throttle port 75 to the conduit system 76. The pressure in conduit system 76 communicates with pressure diaphragm 63, nozzle 71 and with chamber 77 above the differential piston 78 which is movably arranged in servo motor cylinder 79. Chamber 80 at the differential or servo motor piston 78 communicates with the fluid supply conduit 74, and chamber 81 below the servo motor piston 78 is in communication with the atmosphere. The servo motor piston 78 actuates by means of stem 82 and rods 83 the damper 84 in gas duct 85. The pressure in gas duct 85 is applied through impulse pipe 86 to the pressure diaphragm 62.

The mode of operation is as follows:

Supposing for instance that the gas pressure in duct 85 increases. This causes diaphragm 62 to move the lower part of throttle lever 68 to the left, the outflow of pressure fluid through nozzle 71 is checked more, the pressure in conduit system 76 increases, the return motion diaphragm 63 is deflected toward the left, thus tending to return throttle lever 68 toward its original position so that over regulation is prevented. The increase in pressure in the conduit system 76 further causes servo motor piston 78 to move downward and to close damper 84 more, so that the supply of gas to duct 85 is reduced until the increase in gas pressure in duct 85 is compensated. In a similar manner, the regulating system will compensate a decrease in pressure in duct 85 by causing damper 84 to open wider.

If the fluid pressure in supply conduit 74 is maintained constant, equilibrium of the regulating system can only exist at a definite pressure in conduit system 76 and a corresponding definite regulated pressure in duct 85. It is therefore evident that the permanent variation of the regulated pressure is equal to zero so that isobar regulation is obtained. On the other hand, the passing pressure variations may be reduced by providing a pressure diaphragm 62 of great stiffness. By moving the position of edge 69 supporting throttle lever 68 away from rod 66 toward rod 67, a larger pressure differential results in conduit system 76 upon a given impulse or pressure differential in duct 85, so that increased sensitiveness is obtained.

Figure 4:
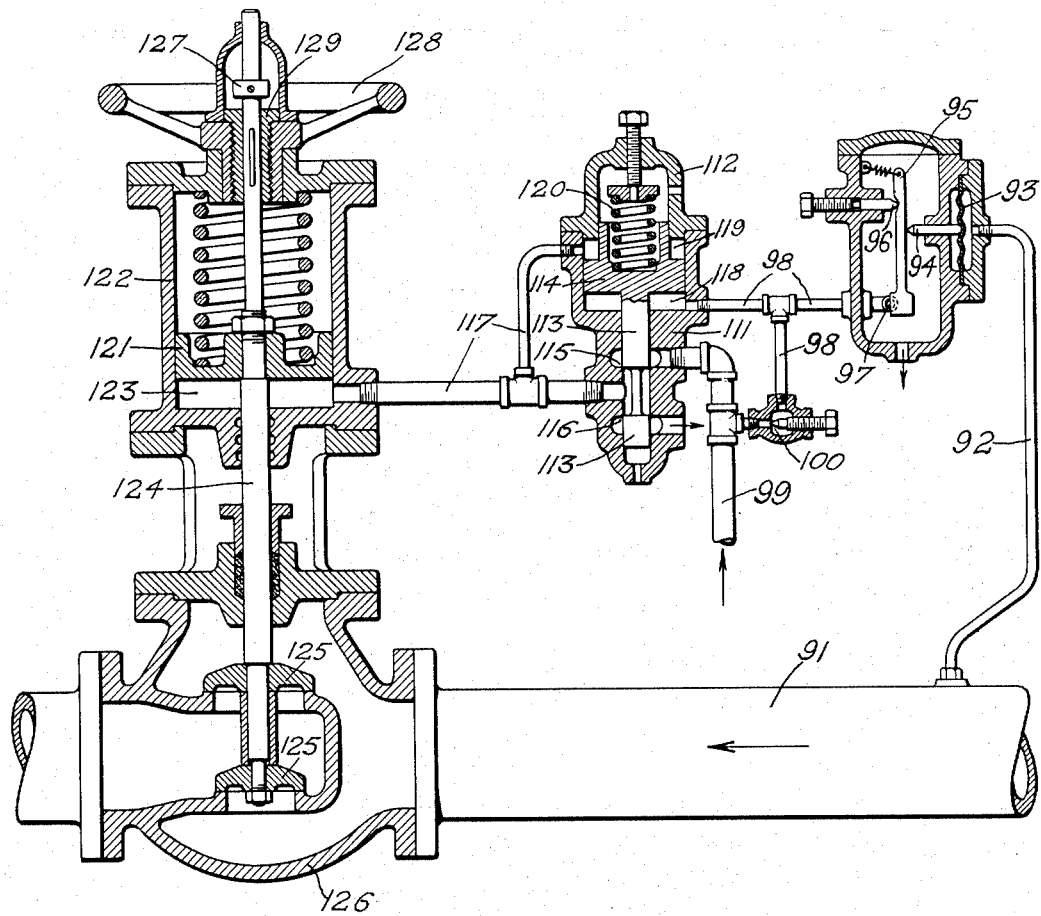
Fig. 4 is a sectional view of still another form of the invention as applied to a pressure regulating valve.

In Fig. 4 is shown an excess pressure regulator. The fluid which is to be controlled, for example steam, is contained in the pipe 91. The pressure in this pipe is transmitted through impulse pipe 92 to act on pressure diaphragm 93. The deflection of this diaphragm is transmitted by rod 94 to throttle lever 95 which is movably supported on edge 96. The lower portion of throttle lever 95 is movable transversely in front of the nozzle 97 so as to control the escape of pressure fluid from the conduit system 98. Pressure fluid is supplied to the conduit system 98 from the fluid supply conduit 99 through the adjustable throttle port 100. The casing which is composed of the parts 111 and 112 contains the movable pilot valve 113 which is in one piece with the differential piston 114. The pilot valve 113 controls ports 115 and 116. Through port 115 communication may be established between the fluid supply conduit 99 and the conduit system 117, and from this system pressure fluid may be passed through port 116 to the atmosphere. Chambers 118 and 119 at the differential piston 114 communicate with the conduit systems 98 and 117 respectively. The differential piston 114 is loaded by the adjustable spring 120. The servo motor consists of the spring loaded piston 121 which is movably arranged in servo motor cylinder 122, and actuated by the fluid pressure in chamber 123, which is in communication with the conduit system 117. The servo motor piston 121 is mounted on valve stem 124 which carries at its lower end the seats 125 of the balanced valve 126, and at its upper end a collar 127. By turning the hand wheel 128, the screw drive 129 is moved against the collar 127 so that in this way the valve 126 may be opened by hand.

The mode of operation is as follows:

Upon an increase of the steam pressure in pipe 91 for example, the diaphragm 93 moves the lower end of the throttle lever 95 to the left, throttle port 97 is closed more, and the pressure in conduit system 98 increases and causes the differential piston 114 and the pilot valve 113 to move upward. Port 116 remains closed and port 115 opens and admits pressure fluid from the supply conduit 99 to the conduit system 117. The resulting increase in pressure in the conduit system 117 and in chamber 119 causes differential piston 114 and pilot valve 113 to move downward until the pilot valve is again in its closed or center position so that over regulation is prevented. At the same tme, the pressure increase in conduit system 117 acts in chamber 123 to move the servo motor piston 121 upward, resulting in an opening movement of valve seats 125 so that the excess pressure in conduit 91 which started the regulating process, is relieved. It is obvious that a decrease in pressure in the pipe 91 will in a similar way cause a closing movement of the valve seats 125.

When equilibrum is established, there corresponds to each position of the valve seats 125 a definite fluid pressure in chamber 123, conduit system 117 and chamber 119. To this fluid pressure in turn corresponds a definite fluid pressure in chamber 118 and conduit system 98, the ratio between the two fluid pressures being determined by the piston areas on differential piston 114 and by spring 120. Since the area of the throttle port 100 is constant, there corresponds to each pressure in conduit system 98 a definite area of throttle port 97, and therefore a definite position of throttle lever 95 and pressure diaphragm 93 and a definite pressure in pipe 91. The regulator system has therefore a certain permanent pressure variation depending upon the opening of valve 126. One of the factors determining this permanent variation is the ratio of the two piston areas on the differential piston 114.

The differential piston 114 is a combination of a relay piston responsive to the regulating pressure impulse and actuating the pilot valve, and of a return motion piston responsive to the fluid pressure actuating the servo motor and acting to return the pilot valve always toward its closed position, so as to prevent over regulation and to obtain stability. The permanent pressure variation of the regulator system may be made small by proper dimensioning of the means transmitting the regulating impulse to the pilot valve, or by suitable proportioning of the piston areas on the differential piston. More important than the permanent variation is the momentary variation which decides the qualities of the regulator system during periods of regulation. By providing for instance a spring 120 with great stiffness, a highly stable regulating system may be obtained, resulting in small momentary or passing pressure variations. It is further beneficial to stability if a differential piston with large diameters in comparison to the diameter of the pilot valve is provided, so that a powerful return motion of the pilot valve is obtain. Another method of increasing the stability of the regulator system consists in providing a highly stable governor, which in the present instance of pressure control means a stiff pressure diaphragm 93, or a small ratio in the transmission of the movement of this diaphragm to the throttle lever 95. The stability of this regulator system is further increased due to the fact that a small regulating impulse, i. e. a small differential in the regulated pressure, causes only a small movement of the pilot valve, resulting in a small movement of the servo motor and control member; whereas a larger differential in the regulated pressure causes a quicker and larger movement of the servo motor.

While my invention has been described with reference to four different embodiments, it is obvious that the same principle may be applied in many different ways. Any known type of servo motor or means for actuating the control member, and any type of instrument or mechanism for transmitting the regulating impulse to the pilot valve or its equivalent may be used instead of the forms described in the foregoing. The regulating impulse may be a differential in any physical, chemical or electrical property of the medium or condition which is to be controlled. Further, I wish it to be understood that my invention, the scope of which is indicated in the appended claims, may be used in conjunction with any particular form of balanced pilot valve, or throttling member for controlling the fluid pressure actuating the servo motor, and with any specific type of fluid, pressure responsive return motion mechanism.

Having thus described my invention, what I claim is:

1. A fluid pressure regulator comprising a servo motor responsive to a fluid pressure, a control member adapted to control said fluid pressure and balanced against the dynamic forces of the pressure fluid which it controls, regulating means responsive to the regulating impulse and exercising a force on said control member, and return motion means responsive to said fluid pressure and exercising a second force on said control member in a direction opposed to the direction of said first force so as to balance said first force in the normal position of said control member.

2. A fluid pressure regulator comprising a servo motor responsive to a fluid pressure, a pilot valve adapted to control said fluid pressure, regulating means responsive to the regulating impulse and exercising a force on said pilot valve, a return motion member responsive to said fluid pressure, and means whereby said return motion member exercises a second force on said pilot valve in a direction opposed to the direction of said first force so as to balance said first force in the center position of the pilot valve.

3. A fluid pressure regulator comprising a servo motor responsive to a fluid pressure, a pilot valve adapted to control said fluid pressure, a differential piston attached to said pilot valve, regulating means responsive to the regulating impulse and adapted to control a second fluid pressure, and means whereby said first and said second fluid pressure are applied to opposed areas of the said differential piston.

4. A fluid pressure regulator comprising a servo motor responsive to a first fluid pressure, a pilot valve adapted to control said first fluid pressure, a differential piston attached to said pilot valve, regulating means responsive to the regulating impulse and adapted to control a second fluid pressure, means whereby said first and said second fluid pressure are applied to opposite areas of the said differential piston, and adjustable resilient means acting on the said differential piston.

5. A fluid pressure regulator comprising a servo motor responsive to a first fluid pressure, a pilot valve adapted to control said first fluid pressure, a differential piston attached to said pilot valve, means whereby said first fluid pressure is made to act on one side of said differential piston, a second fluid pressure system, means whereby said second fluid pressure is made to act on the other side of said differential piston in a direction opposed to the action of said first fluid pressure, adjustable means adapted to throttle the pressure fluid supply to said second fluid pressure system, and means responsive to the regulating impulse to control the exhaust of the pressure fluid from said second fluid pressure system.

6. The method of operating a fluid pressure regulator which comprises defining the magnitude of a first fluid pressure by that which is to be controlled, defining the magnitude of a second fluid pressure by the action of said first fluid pressure, establishing a balance between said two fluid pressures by bringing them into direct opposition so as to obtain a definite relation between said first fluid pressure and said second fluid pressure, and causing a regulating movement due to said second fluid pressure.

7. The method of operating a fluid pressure regulator which comprises defining the magnitude of a force by variation in that which is to be controlled, defining the magnitude of a static fluid pressure by variations in said force, effecting regulation by movement caused by variations in said pressure, and directly opposing said force by said static fluid pressure independently of any forces caused by said regulating movement.

8. The method of operating a fluid pressure regulator which comprises defining the magnitude of a force by variation in that which is to be controlled, defining the magnitude of a static fluid pressure by variation in said force, causing regulating movement by variation in said pressure, and directing a force caused by said pressure against said first named force to balance it.

9. The method of operating a fluid pressure regulator, which comprises defining the magnitude of a force by variation in that which is to be controlled, causing movement by variation in said force, creating by said movement a flow of fluid and a static fluid pressure effecting a regulating movement, and directing a fluid pressure force directly proportional to said static fluid pressure against said first force to reverse said first movement independently of any force created by said regulating movement.

10. The method of operating a fluid pressure regulator which consists in defining the static pressure of a fluid through a force determined by a regulating impulse, effecting regulation through a force exerted by said static pressure, and simultaneously modifying the effect of said first named force by directly opposing to it a third force directly proportional to said static fluid pressure and independent of any force caused by movement due to the regulation effected.

11. The method of operating a fluid pressure regulator which comprises defining the magnitude of a first fluid pressure by that which is to be controlled, defining a second fluid pressure of greater magnitude than the first fluid pressure by the action of said first fluid pressure, establishing a balance between said two fluid pressures by bringing them into direct opposition so as to obtain a definite relation between said first fluid pressure and said second fluid pressure, and causing a regulating movement due to said second fluid pressure.

12. The method of operating a fluid pressure regulator which comprises defining the magnitude of a static fluid pressure by variation in that which is to be controlled, defining the magnitude of a second static pressure by variations in the magnitude of the first pressure, effecting regulation by means of variations in the second pressure, and placing said pressures in direct opposition to prevent over regulation.

13. A fluid pressure regulator comprising a regulating member, a rigid member movable to determine the magnitude of a fluid pressure acting on said regulating member, means for applying positively at all times to said rigid member a force created by a regulating impulse, and means for positively applying said fluid pressure at all times to said rigid member to balance said force.

14. A fluid pressure regulator comprising a servo motor responsive to a fluid pressure, a rigid member adapted to control said fluid pressure, means for positively applying to said rigid member a force created by a regulating impulse, and means for positively applying said fluid pressure to the servo motor and simultaneously to said rigid member in direct opposition to said first named force to balance it.

15. A fluid pressure regulator comprising a fluid pressure actuated servo motor, a rigid member movable to admit an actuating fluid to said servo motor, means for positively applying to said rigid member a force created by a regulating impulse, means adapted to direct a fluid pressure force against said rigid member in opposition to said first named force, and conduits for simultaneously admitting to said motor and to said last named means the actuating fluid controlled by said rigid member.

16. A fluid pressure regulator comprising a servo motor adapted to be actuated by a first pressure fluid, a rigid member movable to regulate the pressure of said fluid, means adapted to direct a force due to said first pressure fluid against said rigid member, means for supplying a second pressure fluid, means actuated by variation in that which is to be controlled for regulating the pressure of said second fluid, means adapted to direct a force due to said second pressure fluid against said rigid member in opposition to said first force, and conduits for simultaneously admitting said first pressure fluid to said servo motor and said first named means.

17. In the operation of regulators comprising a fluid-pressure actuated servo motor, that improvement which consists in utilizing the static pressure controlling the servo motor to directly oppose the force immediately determining said static pressure to balance said force.

18. A fluid pressure regulator comprising a control member movable in response to variations in that which is to be controlled, a fluid-pressure operated servo motor mechanism controlled by variations in fluid pressure caused by movement of said control member, a return motion member actuated by changes in static pressure of the fluid controlling said servo motor mechanism, said return motion member being arranged to react against said control member upon a movement of said control member to balance the latter.

In testimony whereof I affix my signature.

FRITZ WETTSTEIN.